United States Patent Office 3,343,770
Patented Sept. 26, 1967

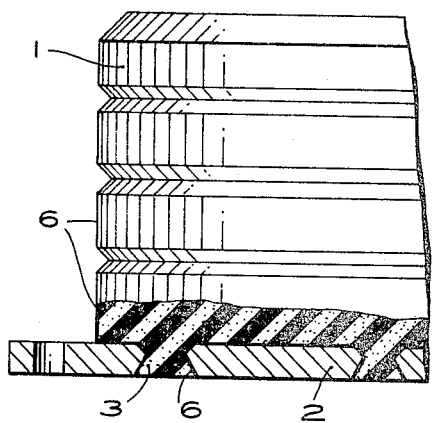
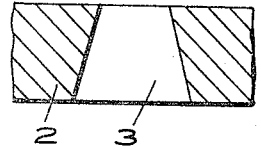
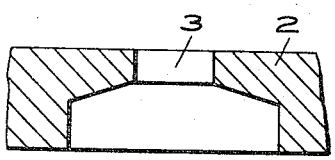
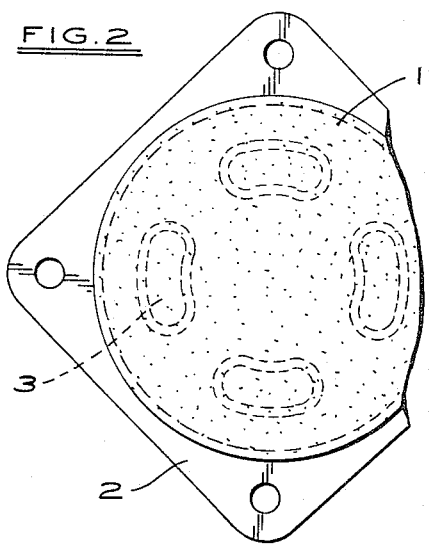
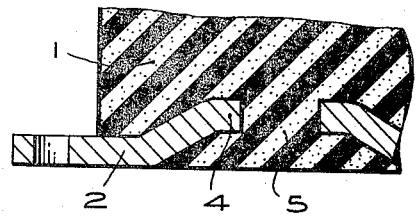
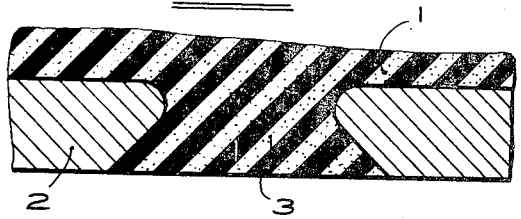

3,343,770
BONDING OF AN ELASTIC SHOCK ABSORBER WITH A RIGID BASE PLATE
Reinhold E. Szonn, Lemforde, Germany, assignor to Cellasto Incorporated, Ann Arbor, Mich., a corporation of Michigan
Filed July 26, 1965, Ser. No. 474,724
2 Claims. (Cl. 248—22)

ABSTRACT OF THE DISCLOSURE

This invention relates to a shock absorber device which can be utilized as a shock absorber or as a spring and comprises a relatively thin mounting plate intended to have a flat uninterrupted mounting surface on the one side and the shock absorbing material on the other. The shock absorbing material is of relatively large volume compared to the plate and is fastened to the plate both by bonding and by a mechanical interlock created by a plurality of openings which enlarge toward the exposed face of the plate wherein projections of the material traced in said openings is integrally joined with the main body of material on the operating side of the plate.

---

This invention relates to the bonding of an elastic shock absorber, particularly when made of cellular elastic material with a rigid base plate provided with perforations in which the elastic material is anchored by infusion.

In order to achieve a durable bond between an elastic shock absorber and a rigid base plate, the parts to be joined are as a rule screwed or clamped together. For this purpose additional means of attachment, such as screws, nuts, threaded sleeves, clamps and the like are required which often must be incorporated into the elastic shock absorber body, thus complicating its structure and making its manufacture difficult and expensive.

Further, it is a known practice to produce the bond of a machine element made of elastic material with a rigid supporting plate in that the plate is completely enveloped by the elastic material with cylindrical bore holes provided in the plate to be permeated by the material. This plate, however, is completely surrounded by the elastic material and therefore can no longer be used for direct rigid attachment to machines, vehicles and the like. In order to accomplish this, additional holding devices are therefore provided with this conventional connection, in the form of cage-like shells, which contain the elastic body on two opposite surfaces. While this connection is durable, it is very expensive and costly, just like the other connections provided with additional holding devices.

It is the object of the invention to firmly and durably join the actual shock absorber body which particularly is made of an elastic material with cellular structure, in a simple manner with a rigid base plate that, for example, even the forces of impact so common with vehicles can be absorbed without loosening the bond between the base plate and the shock absorber body. At the same time, it is contemplated that the flat form of the free bottom surface of the base plate be preserved, in order that it may be attached well and securely to corresponding base surfaces, for example, on the frame or walls of vehicles.

This problem is solved, according to the invention, by the application of the following features:

(a) The perforations become wider in the direction toward the bottom surface of the base plate; and (b) The bottom surface of the base plate is flush with the surface of the material penetrating the perforations. For this purpose, the perforations may be fashioned in the form of a graduated bore, which enlarges in the direction toward the bottom surface of the base plate.

A particularly favorable bonding of the shock absorber to the base plate may be attained if the base plate is fashioned with bulges directed away from the bottom surface and provided with perforations at the top. In this way, the manufacture of the base plate is simplified, since it can now be produced as a molded and punched part to include the openings without requiring supplementary expensive machining. Furthermore, the bulges in the base plate provide, in a simple manner, a relatively large space for the penetration of the in-flowing material between the inlet openings and the bottom opening of the base plate.

The invention makes possible the formation of continuous compartment-like spaces in the base plate into which a relatively large amount of the infused viscous shock absorber material can flow and spread out to the level of the bottom surface so that the plate spaces are completely filled. In this manner, a genuine anchoring of the shock absorber body to the base plate is effected.

The durability achieved in this way can, if so desired, be further enhanced in that a themoplastic plastic with high inherent adhesiveness is used as the shock absorber material. In this event, while avoiding the usual expensive vulcanization process and without the use of particular auxiliary agents and in the course of a single operation, additional adhesion between the elastic material of a shock absorber body and the respective surfaces of the metal base plate is attained and in this way the bond is further strengthened. In all cases a continuous flat surface is created for the bottom plate for the attachment of the shock absorber body to other parts.

Other objects and features of the invention relating to details of construction and operation will be apparent in the following description and claims.

Drawings accompany the disclosure and the various views thereof may be briefly described as:

FIGURE 1, a vertical cut through a buffer connected with a disc.

FIGURE 2, a view of the top of a disc.

FIGURE 3, an enlarged view of a cut through part of a disc with hyperboloid perforations.

FIGURE 4, a cut through a cone and a pyramid-shaped perforation, respectively.

FIGURE 5, a cut through a step perforation.

FIGURE 6, a cut through a bulge in the disc.

In the figures, the buffer of elastic material is designated by 1. This buffer may be made of a synthetic material, preferably one with a cell structure. The bottom of the buffer is fastened to a base disc 2 made of steel. This disc has perforations 3 into which the synthetic material penetrates during the pouring process and where it hardens later on. Because of the hyperboloid, cone- or pyramid-shaped form of the perforations swallow-tail connections are formed that are extremely tight.

FIGURE 5 shows the perforation in the step form, with its largest diameter on the bottom of the disc 2.

FIGURE 6 shows the disc equipped with bulges 4, whose opening 5 may be stamped out and through which the plastic material of the buffer penetrates and fills the hollow space between the opening on top 5 and the bottom of the disc 2. After the material hardens, this yields a substantial anchoring.

As can be seen from FIGURES 1 and 3, the buffer made of cellulose material is surrounded by a protective layer of homogenous material 6 which also coats the perforations of the disc. It is sprayed on the walls of the perforations before the pouring of the buffer, so that also in these places the cellulose buffer is protected against external influences.

I claim:

1. A resilient shock absorber comprising:
   (a) a base plate of rigid supporting material having an exposed face to be fastened to a support, said plate having a plurality of openings distributed in an area to be covered by a shock absorbing material, each said openings widening in a major portion of its axial dimension from the surface of the plate to be covered to the surface of the exposed face, and (b) an integral body of shock absorbing material having a thickness several times that of the base, bonded to a surface of the base opposite the exposed face having integral portions projecting through said openings to fill said openings up to the plane of said exposed face of said plate.

2. A shock absorber as defined in claim 1 in which the openings in said plate are formed by an arched raised portion in the plate in a direction away from the exposed face, each raised portion being perforated to join the material in the raised portion with the main body of material on said plate.

References Cited
UNITED STATES PATENTS

| | | | |
|---|---|---|---|
| 360,919 | 4/1887 | Scofield | 248—346.1 |
| 1,935,202 | 11/1933 | Chamberlain et al. | 287—85 |
| 2,724,770 | 11/1955 | Onksen | 248—358 X |
| 2,729,443 | 1/1956 | Olinger | 267—63 |
| 2,920,884 | 1/1960 | Rowland et al. | 248—22 X |
| 3,060,538 | 10/1962 | Simi | 248—22 X |
| 3,095,187 | 6/1963 | Sweeney et al. | 267—1 |

FOREIGN PATENTS

| | | |
|---|---|---|
| 405,395 | 8/1943 | Italy. |

JOHN PETO, *Primary Examiner.*